United States Patent
Deng

(10) Patent No.: US 12,047,926 B2
(45) Date of Patent: Jul. 23, 2024

(54) MULTI-CARRIER DATA TRANSMISSION METHOD AND APPARATUS

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 449 days.

(21) Appl. No.: 17/426,590

(22) PCT Filed: Jan. 3, 2020

(86) PCT No.: PCT/CN2020/070296
§ 371 (c)(1),
(2) Date: Jul. 28, 2021

(87) PCT Pub. No.: WO2020/156032
PCT Pub. Date: Aug. 6, 2020

(65) Prior Publication Data
US 2022/0150893 A1 May 12, 2022

(30) Foreign Application Priority Data
Jan. 28, 2019 (CN) .......................... 201910081466.1

(51) Int. Cl.
*H04W 72/0453* (2023.01)
*H04W 4/40* (2018.01)
(Continued)

(52) U.S. Cl.
CPC ....... *H04W 72/0453* (2013.01); *H04W 76/14* (2018.02); *H04W 76/15* (2018.02); *H04W 4/40* (2018.02)

(58) Field of Classification Search
CPC . H04W 72/0453; H04W 76/14; H04W 76/15; H04W 4/40
See application file for complete search history.

(56) References Cited

U.S. PATENT DOCUMENTS

2014/0247802 A1 9/2014 Wijting et al.
2015/0156732 A1* 6/2015 Trainin ............... H04W 52/265
370/329
(Continued)

FOREIGN PATENT DOCUMENTS

CN 107241164 A 10/2017
CN 108260163 A 7/2018
(Continued)

OTHER PUBLICATIONS

Extended European Search Report mailed Dec. 8, 2022, issued in corresponding international Application No. 20748443, 6 pages.
(Continued)

*Primary Examiner* — Harry H Kim
(74) *Attorney, Agent, or Firm* — CHRISTENSEN O'CONNOR JOHNSON KINDNESS PLLC

(57) ABSTRACT

Provided are a method and a device for multi-carrier data transmission. The method includes: performing, by a first UE, data transmission between UEs via a first carrier; determining, based on a status of a second UE, a second carrier for performing multi-carrier data transmission; and performing data transmission between UEs via the first carrier and the second carrier. The device includes: a second carrier determination module, configured to determine, based on a status of a second UE, a second carrier for performing multi-carrier data transmission in response to data transmission being performed with the second UE via
(Continued)

a first carrier; and a transmission module configured to perform data transmission between UEs via the first carrier and the second carrier.

15 Claims, 5 Drawing Sheets

(51) Int. Cl.
*H04W 76/14* (2018.01)
*H04W 76/15* (2018.01)

(56) References Cited

U.S. PATENT DOCUMENTS

| | | | | |
|---|---|---|---|---|
| 2020/0186228 | A1* | 6/2020 | Raghavan | H04W 24/10 |
| 2020/0205166 | A1* | 6/2020 | Huang | H04W 76/27 |
| 2020/0275490 | A1* | 8/2020 | Li | H04L 1/1812 |
| 2021/0006954 | A1* | 1/2021 | Xu | H04W 8/04 |
| 2021/0176751 | A1* | 6/2021 | Belleschi | H04W 72/23 |

FOREIGN PATENT DOCUMENTS

| | | |
|---|---|---|
| CN | 109246659 A | 1/2019 |
| EP | 1855391 A1 | 11/2007 |
| WO | 2010131850 A2 | 11/2010 |

OTHER PUBLICATIONS

Discovery Procedure and Connection Setup Procedure in NR Sidelink, 3GPP TSG-RAN WG2 Meeting #103bis, Chengdu, China, Oct. 8-12, 2018, CATT, Agenda Item: 11.4.2.3.

International Search Report and Written Opinion, mailed Apr. 8, 2020, issued in corresponding International Application No. PCT/CN2020/070296, filed Jan. 3, 2020, 12 pages.

www.3GPP.org, "Introduction of eV2X in TS 36.300," 3GPP TSG-RAN WG2 Meeting #102, R2-1809265, Busan, Korea, May 25, 2018, 14 pages.

Intellectual Property India, Examination Report, Indian Patent Application No. 202147038919, Mailed Mar. 30, 2022, 7 pages.

Ericsson, Sidelink Carrier Selection Criteria for TX, 3GPP TSG-RAN WG2#101, 2018, Athens, Greece, 5 pages.

State Intellectual Property Office of People's Republic of China, First Office Action, Chinese Patent Application No. 201910081466.1, Mailed Jan. 25, 2022, 16 pages.

\* cited by examiner

MULTI-CARRIER DATA TRANSMISSION METHOD AND APPARATUS

CROSS-REFERENCE TO RELATED APPLICATIONS

This application is a national stage of International Application No. PCT/CN2020/070296, filed on Jan. 3, 2020, which claims priority to Chinese Patent Application No. 201910081466.1, filed on Jan. 28, 2019. All of the aforementioned applications are hereby incorporated by reference in their entireties.

TECHNICAL FIELD

The present disclosure relates to the field of wireless communication technologies, and in particular, to a method for multi-carrier data transmission and a device for multi-carrier data transmission.

BACKGROUND

In 3GPP ($3^{rd}$ Generation Partnership Project), LTE (Long Term Evolution) introduces direct communication (Sidelink Communication). Different UEs (User Equipment) may communicate directly.

Nowadays, 3GPP is studying introduction of V2X (Vehicle-to-Everything) in 5G ($5^{th}$ Generation Mobile Communication Network). Since a 5G system may provide greater bandwidth and lower latency, it may better meet service requirements of V2X.

In order to improve reliability of V2X data transmission, V2X transmission may adopt a duplication mechanism, that is, a Tx UE (transmitting UE) may transmit same data to a same UE on two different carriers at the same time. For an Rx UE (receiving UE), it is sufficient to receive data on any of the carriers, while reliability of V2X transmission may be improved through the repeated transmission.

However, in the existing duplication mechanism, since there is no need to consider feedback, the Tx UE freely selects the carrier that implements the duplication mechanism based on capability when it adopts the duplication mechanism, without caring whether the Rx UE can receive data simultaneously on these carriers, thereby leading to poor data transmission.

SUMMARY

In view of this, the present disclosure proposes a method for multi-carrier data transmission and a device for multi-carrier data transmission, which can select a corresponding carrier according to a situation of UE at a receiving side when multi-carrier transmission is required, thereby improving an effect of multi-carrier data transmission.

In a first aspect of the present disclosure, a method for multi-carrier data transmission applied to a first user equipment (UE) is provided. The method for multi-carrier data transmission includes: performing, by the first UE, data transmission between UEs via a first carrier; determining, based on a status of a second UE, a second carrier for performing multi-carrier data transmission; and performing data transmission between UEs via the first carrier and the second carrier.

In a possible implementation, said determining, based on the status of the second UE, the second carrier for performing multi-carrier data transmission includes: acquiring at least one candidate carrier; sending information to the second UE based on the at least one candidate carrier; and determining, based on a feedback result of the second UE, the second carrier for performing multi-carrier data transmission.

In a possible implementation, said acquiring the at least one candidate carrier includes: selecting at least one carrier that is capable of being aggregated with the first carrier as the at least one candidate carrier.

In a possible implementation, said acquiring the at least one candidate carrier includes: screening at least one carrier that is capable of being aggregated with the first carrier to obtain a screening result; and selecting, from the screening result, at least one carrier having an available transmission resource as the at least one candidate carrier.

In a possible implementation, said sending information to the second UE based on the at least one candidate carrier includes: sending a message of the at least one candidate carrier to the second UE; or configuring a reference signal on the at least one candidate carrier, and sending a configuration parameter of the reference signal to the second UE.

In a possible implementation, the feedback result of the second UE includes: a carrier selected by the second UE from the message of the at least one candidate carrier based on capability of the second UE; or a carrier selected by the second UE from the at least one candidate carrier based on a reception result of the reference signal.

In a possible implementation, said determining, based on the status of the second UE, the second carrier for performing multi-carrier data transmission includes: acquiring a carrier reception status of the second UE; determining, based on the acquired result, at least one candidate carrier; and determining, based on the at least one candidate carrier and in combination with the status of the second UE, the second carrier for performing multi-carrier data transmission.

In a possible implementation, said acquiring the carrier reception status of the second UE includes: directly acquiring the carrier reception status of the second UE; or instructing the second UE that multi-carrier data transmission is required, and acquiring the carrier reception status of the second UE that is fed back.

In a possible implementation, the carrier reception status of the second UE includes: carrier aggregation capability of the second UE for data transmission; or bandwidth combination capability of the second UE.

In a possible implementation, the carrier reception status of the second UE includes: the carrier aggregation capability of the second UE with the first carrier during a process in which the second UE performs data transmission.

In a possible implementation, in response to the first UE needing feedback, the status of the second UE further includes: a sensing result of the second UE on the at least one candidate carrier.

In a possible implementation, in response to the first UE needing feedback, the status of the second UE further includes: a power compensation status of the second UE on the at least one candidate carrier; or an expected power compensation status of the second UE.

In a second aspect of the present disclosure, a device for multi-carrier data transmission is provided, the device includes: a second carrier determination module, configured to determine, based on a status of a second UE, a second carrier for performing multi-carrier data transmission in response to data transmission being performed with the second UE via a first carrier; and a transmission module configured to perform data transmission between UEs via the first carrier and the second carrier.

In a possible implementation, the second carrier determination module includes: a candidate carrier acquisition unit configured to acquire at least one candidate carrier; an information sending unit configured to send information to the second UE based on the at least one candidate carrier; and a second carrier determination unit configured to determine the second carrier for performing multi-carrier data transmission based on a feedback result of the second UE.

In a possible implementation, the candidate carrier acquisition unit is configured to select at least one carrier that is capable of being aggregated with the first carrier as the at least one candidate carrier.

In a possible implementation, the candidate carrier acquisition unit is configured to: screen at least one carrier that is capable of being aggregated with the first carrier to obtain a screening result; and select, from the screening result, at least one carrier having an available transmission resource as the at least one candidate carrier.

In a possible implementation, the information sending unit is configured to: send a message of the at least one candidate carrier to the second UE; or configure a reference signal on the at least one candidate carrier, and send a configuration parameter of the reference signal to the second UE.

In a possible implementation, the feedback result of the second UE includes: a carrier selected by the second UE from the message of the at least one candidate carrier based on capability of the second UE; or a carrier selected by the second UE from the at least one candidate carrier based on a reception result of the reference signal.

In a possible implementation, the second carrier determination module includes: a carrier reception status acquisition unit configured to acquire a carrier reception status of the second UE; a candidate carrier determination unit configured to determine the at least one candidate carrier based on the acquired result; and a second carrier determination unit configured to determine, based on the at least one candidate carrier and in combination with the status of the second UE, the second carrier for performing multi-carrier data transmission.

In a possible implementation, the carrier reception status acquisition unit is configured to: directly acquire the carrier reception status of the second UE; or instruct the second UE that multi-carrier data transmission is required, and acquire the carrier reception status of the second UE that is fed back.

In a possible implementation, the carrier reception status of the second UE includes: carrier aggregation capability of the second UE for data transmission; or bandwidth combination capability of the second UE.

In a possible implementation, the carrier reception status of the second UE includes: the carrier aggregation capability of the second UE with the first carrier during a process in which the second UE performs data transmission.

In a possible implementation, in response to the device needing feedback, the status of the second UE further includes: a sensing result of the second UE on the at least one candidate carrier.

In a possible implementation, in response to the device needing feedback, the status of the second UE further includes: a power compensation status of the second UE on the at least one candidate carrier; or an expected power compensation status of the second UE.

In a third aspect of the present disclosure, a device for multi-carrier data transmission is provided and the device for multi-carrier data transmission includes: a processor configured to execute the method according to the above-mentioned first aspect and a memory configured to store instructions executable by the processor.

In a fourth aspect of the present disclosure, a computer-readable storage medium having computer program instructions stored therein is provided, and the computer program instructions are configured, when executed by a processor, to implement the method according to the above-mentioned first aspect.

According to following detailed description of exemplary embodiments with reference to accompanying drawings, other features and aspects of the present disclosure will become apparent.

BRIEF DESCRIPTION OF DRAWINGS

Drawings included in specification and constituting a part of specification together with the specification illustrate exemplary embodiments, features, and aspects of the present disclosure, and are used to explain principle of the present disclosure.

DESCRIPTION OF EMBODIMENTS

Figure 1:
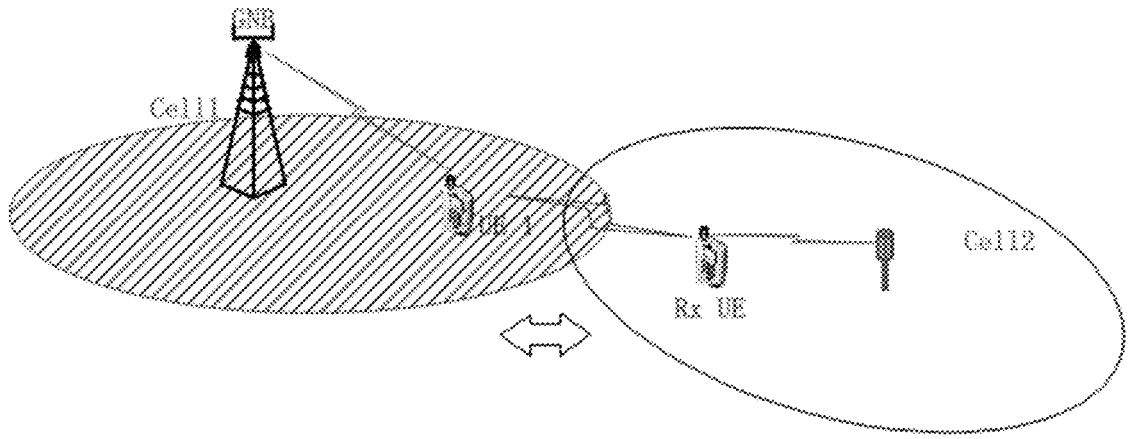
FIG. 1 shows a schematic diagram of an application example according to the present disclosure.

Hereinafter, various exemplary implementations, features, and aspects of the present disclosure will be described in detail with reference to the accompanying drawings. Same reference numerals in the drawings indicate elements with same or similar functions. Although various aspects of the embodiments are shown in the accompanying drawings, unless otherwise noted, the drawings are not necessarily drawn to scale.

The dedicated expression "exemplary" here means "serving as an example, embodiment, or illustration". Any implementation described herein as "exemplary" need not be construed as being superior to or better than other embodiments.

In addition, in order to better illustrate the present disclosure, numerous specific details are given in following specific embodiments. It should be understood for those skilled in the art that the present disclosure may also be implemented without certain specific details. In some examples, methods, means, elements, and circuits that are well known to those skilled in the art have not been described in detail in order to highlight gist of the present disclosure.

In Release 12 of 3GPP protocol, direct communication (ProSe Direct Communication, or Sidelink Communication) is introduced to LTE. Direct communication may be performed via a PC5 interface between different UEs, such as UE A and UE B, or between more UEs. The PC5 interface is a direct interface between UEs.

In a process of communication between UEs, there are two ways for allocating the resources. One is allocation by scheduling resources, which is configured by a base station through dedicated signaling. The other one is automatic resource selection, where the base station may provide a resource pool for direct communication for the UE via system messages or RRC (Radio Resource Control) signaling, and the UE selects the resource for direct communication from the resource pool. If a Tx UE (Transmitter UE) is not within the network coverage, the UE adopts the method of automatic resource selection to select resources for direct communication from a pre-configured resource pool.

Based on direct communication, 3GPP also supports V2X. Within a network coverage, a certain UE may send V2X messages to a plurality of UEs. It should be noted that neither of the Rx UE and the Tx UE may be within the network coverage, alternatively, some UEs may be within the network coverage.

Nowadays, 3GPP is working on introduction of V2X in 5G. Since a 5G system may provide greater bandwidth and lower latency, it may better meet service requirements of V2X. Moreover, 3GPP has agreed that V2X in 5G may transmit V2X services by means of unicast, groupcast, or broadcast. When the Tx UE adopts unicast or groupcast, feedback may be introduced. Meanwhile, in order to improve reliability of V2X data transmission, V2X transmission may adopt a duplication mechanism, that is, Tx UE may transmit the same V2X data to the same Rx UE on two different carriers at the same time. Here, the expression "at the same time" means simultaneous transmission in a same time slot or in different time slots. For the Rx UE, it only needs to receive the data on any one carrier. If two same data packets are received on two different carriers, one of the packets will be discarded by the Rx UE. Duplicated transmission may improve reliability of V2X transmission, so how to implement the duplicated transmission is what needs to be solved, i.e., how to determine at least two carriers that are capable of implementing the duplication mechanism.

In LTE, V2X transmission only needs to consider channel conditions of the Tx UE itself, and it get no feedback, therefore there is no need to consider a scenario of bidirectional transmission. In LTE, V2X may also adopt the duplication mechanism. However, since there is no need to consider feedback, Tx UE freely selects the carrier that implements the duplication based on capability when it adopts the duplication mechanism, and does not need to care whether the Rx UE can receive data simultaneously on these carriers, therefore effect of duplication is not good.

In order to solve the above problems, the present embodiment discloses an application example of a method for multi-carrier data transmission. FIG. 1 shows a schematic diagram of the application example according to the present disclosure. In this example, UE 1 in an idle status located in a serving cell 1 (Cell 1) is performing bidirectional V2X transmission with the Rx UE located in serving cell 2 (Cell 2). During the initial establishment of a bidirectional connection, any one of the parties may initiate a connection request to the other party, and then the one party may start the V2X transmission after receiving the other party's reply. Alternatively, both parties may use default parameter configurations to directly perform V2X transmission. The frequency of V2X transmission between UE 1 and Rx UE at this moment can be assumed as F1.

After a period of time, UE1 and Rx UE decide to launch a new V2X service. In this example, the V2X data is transmitted from UE 1 to Rx UE. According to the service quality parameters of the service, the reliability of the service is very demanding, and feedback is also required. Therefore, UE 1 decides to adopt a duplication mechanism to transmit the V2X service, and accordingly, it is required to determine another carrier to transmit data of the V2X service.

To determine which carrier is required for duplicated transmission, UE 1 may actively acquire the following information: for example, the capability of Rx UE, which may refer to a frequency for the Rx UE to perform carrier aggregation with the current F1, or a bandwidth combination for Rx UE supporting V2X, whether the Rx UE is capable of receiving data simultaneously on another carrier, and the possibility that the Rx UE transmits feedback on that carrier; signal quality of the PC5 link for direct communication on an optional carrier; results of sensing on the optional carrier by the Rx UE; and whether the Rx UE is capable of executing feedback by performing power compensation according to the path loss of the direct link (SL PL, SideLink PathLoss). By acquiring the above information, the UE 1 may select a carrier suitable for Rx UE to receive data based on the acquired result, thereby improving the effect of the duplication mechanism and improving the reliability of data transmission.

Figure 2:
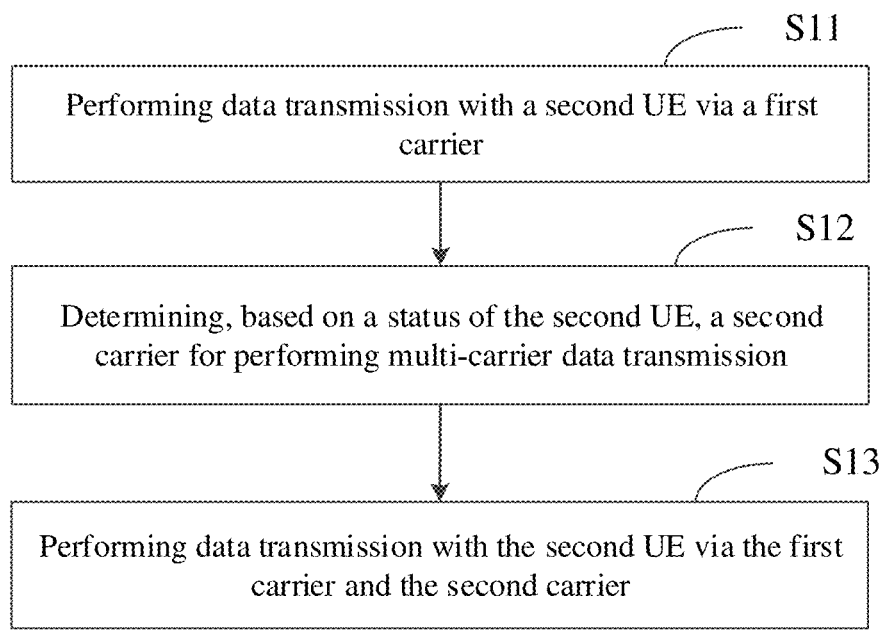
FIG. 2 shows a flow chart of a method for multi-carrier data transmission according to an embodiment of the present disclosure.

FIG. 2 shows a flow chart of a method for multi-carrier data transmission according to an embodiment of the present disclosure. The method may be executed by a first UE. As shown in FIG. 2, the method may include the following steps.

In S11, data transmission is performed with a second UE via a first carrier.

In S12, based on a status of the second UE, a second carrier for performing multi-carrier data transmission is determined.

In S13, data transmission is performed with the second UE via the first carrier and the second carrier.

The position where the second UE is located is not limited, that is, it may be located in the same serving cell as the current UE, or may be located in a neighboring area of the serving cell where the current UE is located, or may not be within the network coverage. The frequency of the first carrier is not limited and may be flexibly selected according to the specific conditions of data transmission. The content of data transmission between the first UE and the second UE via the first carrier is not limited, that is, specific data or control messages may be transmitted. The transmission mode of multi-carrier data transmission is not limited either, that is, the same data may be transmitted on different carriers by means of the duplication mechanism, or, different data may be transmitted on different carriers. The direction of data transmission between the first UE and the second UE is not limited either, that is, it may be unidirectional data transmission or bidirectional data transmission. The number of the second carriers is not limited either, that is, the second carrier may be a single carrier with a certain frequency or multiple carriers which have different frequencies. The content about the status of the second UE is not limited either, that is, it may be the capability of the second UE to receive information transmitted on the carrier, or it may be the result of the selected carrier that the second UE feeds back to the first UE, or it may be other information content fed back by the second UE. They may be flexibly selected according to the actual situations. There will be detailed description in the example below, which should not be defined or enumerated herein.

Figure 3:
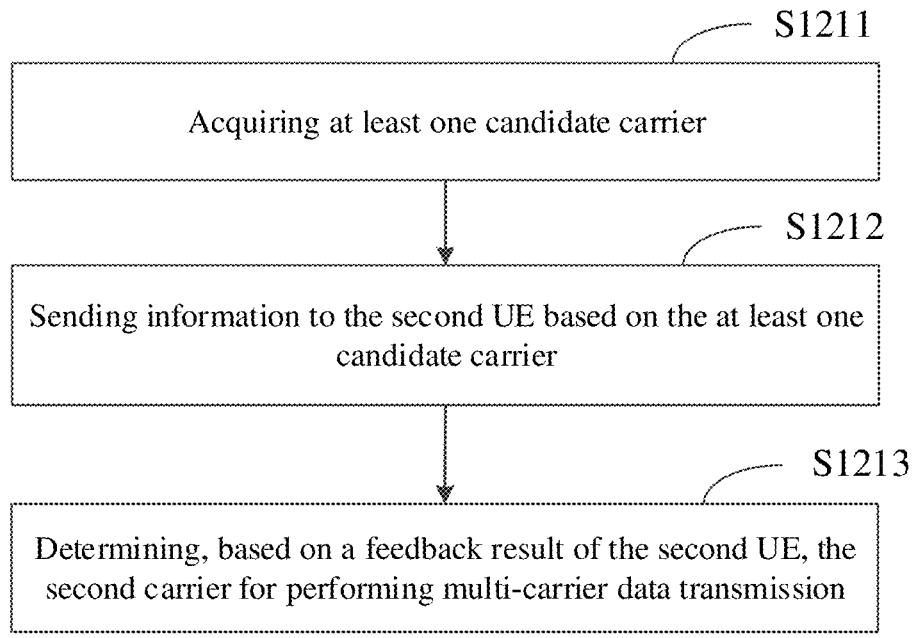
FIG. 3 shows a flow chart of a method for multi-carrier data transmission according to an embodiment of the present disclosure.

The selection process for the second carrier may be flexibly determined according to the actual conditions. FIG. 3 shows a flow chart of a method for multi-carrier data transmission according to an embodiment of the present disclosure. In a possible implementation, the S12 may include the following steps.

In S1211, at least one candidate carrier is acquired.

In S1212, information is sent to the second UE based on the at least one candidate carrier.

In S1213, a second carrier for performing multi-carrier data transmission is determined based on the feedback result of the second UE.

In the above process, a main basis for determining the second carrier for performing multi-carrier data transmission is that: the first UE acquires the candidate carriers that can perform multi-carrier data transmission first, and then notifies the second UE of the candidate carriers available for selection; the second UE may select, based on the received notification, a carrier that matches its own status from the at least one candidate carrier, and may use it as the medium for multi-carrier data transmission.

The method by which the first UE acquires the candidate carrier is not limited. In a possible implementation, a process for acquiring the candidate carrier may be as follows: the carriers that can be aggregated with the first carrier is screened out as the candidate carriers. In an example, the first UE detects the other available carriers based on its own capability. For example, the first UE may detect other available carriers from the carriers that can perform V2X carrier aggregation. In this example, the first carrier that allows the first UE to perform data transmission properly with the second UE may be denoted as F1. If the first UE detects based its own capability that F2, F3, and F4 can each perform carrier aggregation with F1, then F2, F3, and F4 may all be used as candidate carriers.

In a possible implementation, a process for acquiring candidate carriers may be as follows: the carriers that can be aggregated with the first carrier are screened out, and thus the screening result is acquired; and the carriers having available transmission resources are selected from the screening result as the candidate carriers. The process for screening out the carriers that can be aggregated with the first carrier may be any one of the above processes, which will not be elaborated here. After the screening result is acquired, the first UE may further select the carriers having available transmission resources based on the screening result. In this way, some carriers that cannot perform effective data transmission may be excluded, thereby further improving the reliability of data transmission. In an example, selecting carriers having available transmission resources from the screening result may be as follows: the first carrier that allows the first UE to perform data transmission properly with the second UE may be denoted as F1, and if the first UE detects based on its own capability that F2, F3, and F4 may each perform carrier aggregation with F1, then F2, F3, and F4 would be the acquired screening results; on frequencies of F2, F3, and F4, the first UE may detect a strongest serving cell for each frequency, e.g., Cell F2 is the strongest cell detected by the first UE on F2, Cell F3 is the strongest cell detected by the first UE on F3, and Cell F4 is the strongest cell detected by the first UE on F4.

The first UE may determine whether there are available transmission resources on these frequencies according to the V2X transmission resource pool configured in the system messages for these serving cells. The determining process is not limited and may be flexibly selected according to the actual situations. In an example, determining whether there are available transmission resources on each frequency may be performed with a sensing mechanism. By the sensing mechanism, the transmission resources reserved by other UEs may be excluded, and the transmission resources whose signals exceed a threshold may be excluded. The sensing process may be as follows: the first UE senses signals in the transmission resource pool, and if a signal exceeds the threshold, the first UE needs to exclude these transmission resources. In an example, a specific process of sensing may be as follows: the first UE senses a signal in the transmission resource pool of the cell where a certain frequency is located. If remaining transmission resources in the transmission resource pool are less than 20% of total resources, the first UE may raise the threshold. The specific value of the raised threshold is not limited, and may be selected according to the actual situations. In an example, the threshold can be raised by 3 dB each time, and then the first UE re-determines whether the remaining resources reach 20% of total resources. In an example, the manner of determining whether there are available transmission resources on each frequency may also be a related mechanism with other name, as long as the purpose in the above processes may be achieved. By the above processes, the first UE may determine whether the available transmission resources can be acquired from the screened frequencies, and may further determine the interference level of the transmission resources on these frequencies. In an example, it is assumed that in the process for determining the available transmission resources, if the threshold has not been raised, then it may be considered that there are transmission resources with less interference on the frequency. In an example, it may be considered that the first UE finds that there are available transmission resources on F2 and F3. At this time, the first UE may use F2 and F3 as candidate carriers, and then perform subsequent processes.

After acquiring the candidate carriers, information may be sent to the second UE based on the acquired result, so that the second UE may screen out the finally available carriers from the candidate carriers, and the manner of sending information to the second UE is not limited, which may be flexibly selected according to the actual situations. In a possible implementation, sending information to the second UE based on the candidate carrier may include: sending a message of the candidate carrier to the second UE; or, configuring a reference signal on the candidate carrier, and sending configuration parameters of the reference signal to the second UE. The signaling may be sent to the second UE via a direct link radio resource control (PC5 RRC, PC5 Radio Resource Control) signaling.

Since the manner of sending information to the second UE based on the acquired result is not limited, the feedback result of the second UE may also change with the change of the manner of sending information. In a possible implementation, the feedback result of the second UE may include: the carrier selected by the second UE from the message of the candidate carrier based on its own capability; or the carrier selected by the second UE from the candidate carriers based on a reception result of the reference signal.

In an example, the first UE may send a message of the candidate carrier to the second UE. Following the above example, the candidate carriers finally acquired by the first UE may be F2 and F3. At this time, the first UE may notify the second UE of the fact that F2 and F3 are candidate carriers. The notification manner is not limited, that is, the second UE may be notified by sending a notification message or by any other available notification manners. After the second UE has received the message sent by the first UE, it may select the available carrier from the message of the candidate carrier based on its own capability, that is, the second UE may determine on which combination of carriers it can receive the transmitted data or message. In an example, the second UE may find that the available carrier combinations for performing V2X carrier aggregation are F1+F2, F1+F3, or F2+F3, but not F1+F2+F3. That is, the second UE does not support receiving or transmitting data simultaneously on F1, F2, and F3. Therefore, the second UE may feedback the carrier combination supported by itself to the first UE. After the first UE receives this feedback result, multi-carrier transmission may be performed in form of F1+F2 or F1+F3 instead of F1+F2+F3.

In an example, the first UE may configure reference signals on other optional carriers to the second UE, and send the configuration parameters of the reference signals to the second UE together. The configuration manner is not limited, which may be selected according to the actual situations. In an example, the first UE may notify the second UE of the configuration of the reference signal by means of PC5 RRC signaling, while the first UE sends the reference signal on the optional carriers. The form of the configured reference signal is not limited either. In an example, the first UE may configure the reference signal (e.g., signal generation parameters, cycle, time slot position, and the position in time slot, etc.) sent by itself on the candidate carrier. After receiving the configured reference signal, the second UE may select a second carrier to perform multi-carrier transmission by performing determination based on a certain basis, and then feed it back to the first UE. The basis of determination is not specifically limited, and may be selected according to the actual situation. In an example, the second UE may select a carrier that can perform V2X carrier aggregation based on its own capability. The forms of its own capability may be as described above, which are hence not elaborated here. In an example, the second UE may determine which carrier is suitable for performing multi-carrier transmission according to the signal values detected on different candidate carriers. In an example, the second UE may detect the reference signal sent by the first UE on different candidate carriers, and when the quality of the detected reference signal exceeds a preset threshold, the corresponding carrier information is fed back to the first UE. This preset threshold value is not specifically limited, which may be flexibly selected according to the actual situation. That is, a default value set by a protocol may be used, or it may be set by the first UE via PC5 RRC signaling. In an example, the second UE may detect that only the reference signal on F2 exceeds the preset threshold, and then, the second UE may feed back to the first UE that multi-carrier data transmission may be performed on F2.

Figure 4:
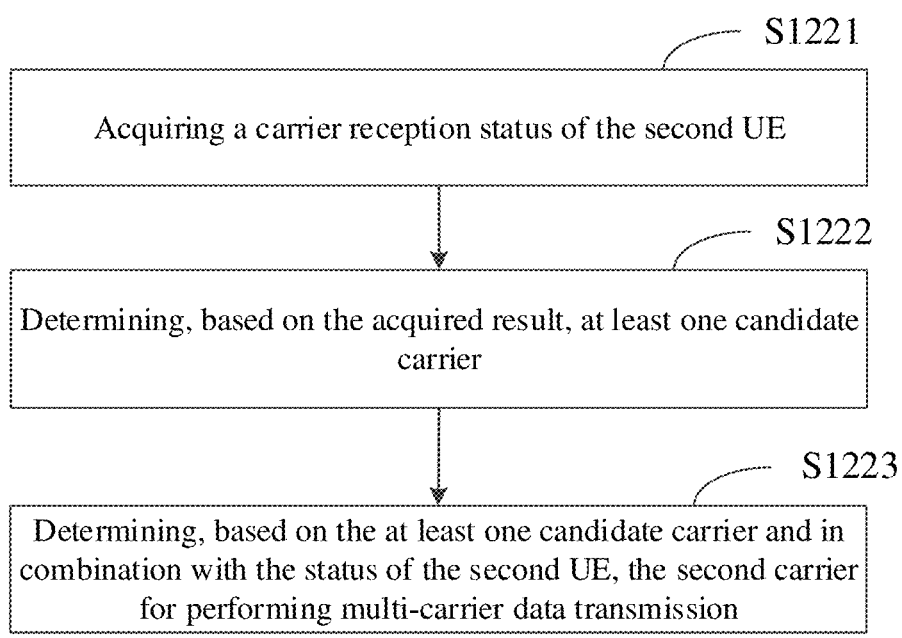
FIG. 4 shows a flow chart of a method for multi-carrier data transmission according to an embodiment of the present disclosure.

In addition to the above-mentioned implementation method, the second carrier selection process may also adopt other methods. FIG. 4 shows a flow chart of a method for multi-carrier data transmission according to an embodiment of the present disclosure. In a possible implementation, S12 may include following steps.

In S1221: a carrier reception status of the second UE is acquired.

In S1222: at least one candidate carrier is determined based on the acquired result.

In S1223: the second carrier for performing multi-carrier data transmission is determined based on the at least one candidate carrier and in combination with the status of the second UE.

In the above processes, a main basis for determining the second carrier for performing multi-carrier data transmission is that the first UE first acquires the carrier reception status of the second UE, and then determines the candidate carrier based on acquired result. After the candidate carrier is determined, the second carrier is determined in combination with the status of the second UE1. The status here may refer to the feedback result of the second UE after receiving the information sent by the first UE in the foregoing implementation, and may also refer to any situation of the status of the second UE in the embodiments, which are not elaborated here. No matter what status of the second UE specifically refers to, the above processes mainly indicate that after the first UE determines the candidate carrier based on the carrier reception status of the second UE, any of the above-mentioned possible implementations may be used to determine the second carrier. Therefore, after acquiring the candidate carrier, it will not be elaborated here how to determine the second carrier for performing multi-carrier data transmission. The current implementation focuses on how to determine the candidate carrier by acquiring the carrier reception status of the second UE.

The manner in which the first UE acquires the carrier reception status of the second UE is not limited. In a possible implementation, acquiring the carrier reception status of the second UE may include: directly acquiring the carrier reception status of the second UE; or, instructing the second UE that multi-carrier data transmission is required, and acquiring a feedback status of the second UE.

As to directly acquiring the carrier reception status of the second UE, the specific acquiring manner is not limited. Any manner in which the first UE actively obtains the carrier reception status of the second UE may be adopted. In an example, directly acquiring the carrier reception status of the second UE may be as follows: the first UE directly sends a message to the second UE so as to request the second UE to provide its own carrier reception status, and obtains the requested content based on the feedback of the second UE. Similarly, as to instructing the second UE that multi-carrier data transmission is required, and acquiring a feedback status of the second UE, the specific acquisition process is not limited either, a main difference between this manner and direct acquisition is that the first UE notifies to the second UE that multi-carrier data transmission is required, prior to acquisition of the carrier reception status of the second UE. Therefore, the possible feedback results of the carrier reception status are more targeted for multi-carrier data transmission.

The specific content of the carrier reception status of the second UE is not limited. In a possible implementation, the carrier reception status of the second UE may include: carrier aggregation capability of the second UE for data transmission; or, bandwidth combination capability of the second UE. In an example, the carrier aggregation capability of the second UE for data transmission may refer to that the aggregation effects may be achieved by the second UE in different carrier aggregations when the second UE receives data transmitted by multiple carriers. In an example, the bandwidth combination capabilities of the second UE may refer to the effect of the second UE performing multi-carrier transmission in different bandwidth combinations. In an example, the carrier aggregation capability and bandwidth combination capability of the second UE for data transmission, the corresponding carrier aggregation and bandwidth combination are all not limited. That is, for the second UE in the currently available carrier and bandwidth, any combination of carrier aggregation and any combination of bandwidth, as well as the corresponding effects may all be used as the carrier reception status of the second UE.

In a possible implementation, the carrier reception status of the second UE may further include: the carrier aggregation capability of the second UE with the first carrier when the second UE performs data transmission. The main difference between the carrier reception statuses of the second UE and the above-mentioned second UE is that, in this example, the carrier reception status of the second UE only considers the carrier aggregation capability of the second UE based on the first carrier or the corresponding bandwidth combination capability. Since the second UE itself communicates with the first UE via the first carrier, data transmission will still be performed on the first carrier when the second carrier is selected for multi-carrier data transmission. Therefore, the carrier aggregation and bandwidth combination which does not include the first carrier will most likely not be used during the final multi-carrier data transmission. Therefore, when the carrier reception status of the second UE only includes the carrier aggregation capability with the first carrier, the efficiency of selecting the candidate carriers can be greatly improved, thereby improving the efficiency and reliability of multi-carrier data transmission.

Based on any possible combination of examples in the foregoing implementations, a complete process as followed may be achieved: the first UE determines the candidate carrier by acquiring the carrier reception status of the second UE, and then determines the second carrier based on the candidate carrier. In an example, this process may be as follows: the first UE is currently performing data transmission with the second UE via the carrier F1; and after acquiring the carrier reception status of the second UE, the candidate carrier is determined through negotiation. This status may be the carrier information that is fed back by the second UE, referring that the second UE itself can perform the V2X carrier aggregation with the current F1. In this example, the final result of this status may be as follows: the first UE learns that there are the other carriers which the second UE can perform V2X carrier aggregation with the current F1. Meanwhile, the first UE itself also supports V2X carrier aggregation in the form of two combinations of F1 and F2, and F1 and F3. Therefore, the first UE may configure the reference signal on these two carriers F2 and F3, so that the second UE may measure the direct link signal quality on the two frequencies F2 and F3. The second UE performs the measurement and returns the measurement result to the first UE, so that the first UE may select the second carrier to perform multi-carrier transmission. In an example, this process may be as follows: the first UE first instructs the second UE that multi-carrier data transmission is required, and after the instruction, the second UE returns to the first UE the capability information that it may perform bandwidth combination with the current carrier F1, such as combination of F1 and F2, or combination of F1 and F3, and then the first UE selects candidate carriers from the above two combinations, and may configure a reference signal for measurement, and then determines the second carrier by using same process as the above example. Alternatively, the two available carriers F2 and F3 may be directly notified to the second UE via a message, and the second UE may perform further screening and finally select the second carrier. Alternatively, a carrier such as F2 is directly selected to transmit V2X data to the second UE. In addition to these several examples, there are other arbitrary combinations to implement this process. Those skilled in the art may make further combination attempts and expansions based on the above examples, which will not be elaborated here.

In some cases, the first UE may perform bidirectional V2X transmission with the second UE, so that the first UE may require feedback from the second UE. Therefore, determining the second carrier for performing multi-carrier data transmission based on the status of the second UE may require more status information from the second UE. In a possible implementation, when the first UE requires feedback, the status of the second UE further includes a sensing result of the second UE on the candidate carrier. The sensing of the second UE on the candidate carrier is not limited. In an example, the second UE may perform detection on the candidate carrier by sensing, so as to acquire a required detection result and feed it back to the first UE. The specific sensing process is basically the same as the above process, which is not elaborated here. In an example, the second UE may also perform detection on the candidate carrier in other manners, their principle may be similar to the sensing process and their name may be changed. Content of detection result of the second UE on the candidate carrier is not limited either. In an example, the second UE may select a carrier with low interference among candidate carriers via sensing, and feed it back to the first UE. In an example, the second UE may select a carrier with available transmission resources among candidate carriers via sensing, and feed it back to the first UE. In an example, the second UE may find that it may perform V2X bidirectional transmission on a certain carrier, then this carrier may be fed back to the first UE, or carrier information of this carrier may be fed back to the first UE. In an example, the second UE may receive a request of the first UE to detect on the candidate carrier, and receive a configuration signal of the first UE on the candidate carrier. At this time, the second UE may return a measured value of the configuration signal and sensing result to the first UE, or only when the measured value exceeds the threshold and a carrier with available transmission resources is sensed, available carrier information is returned to the first UE.

In LTE, in addition to the available carriers, it is required to consider the transmission power of transmission on the available carriers for the V2X transmission. If the UE performing V2X transmission uses transmission resources configured by the serving cell to perform V2X transmission, power control needs to be performed. The transmission should not be performed with the maximum power of the UE, instead, it is necessary to consider the impact on the serving cell.

A specific calculation formula for a transmission power value of the UE on a PSSCH (Physical Sidelink Share Channel) is as below.

$$P_{PSSCH} = 10\log_{10}\left(\frac{M_{PSSCH}}{M_{PSSCH} + 10^{\frac{3}{10}} \times M_{PSSCH}}\right) + \min\{P_{CMAX},$$

$$10\log_{10}(M_{PSSCH} + 10^{\frac{3}{10}} \times M_{PSCCH}) + P_{O\_PSSCH,3} + \alpha_{PSSCH,3} \cdot PL\}$$

In this formula, $P_{PSSCH}$ represents a transmission power value of a transmission UE on the PSSCH, $M_{PSSCH}$ is a number of resource blocks of the PSSCH used by the transmission UE, $M_{PSCCH}$ is a number of resource blocks of a PSCCH (Physical Sidelink Control Channel) used by the transmission UE, $P_{CMAX}$ is the maximum generation power of the transmission UE on a current frequency, PL is path loss of the serving cell detected by the transmission UE (the UE uses the transmission resources provided by the current serving cell to perform V2X transmission), $P_{O\_PSSCH,3}$ and $\alpha_{PSSCH,3}$ are parameters configured by a high layer. Calculation of path loss is known in the art, which is a difference between the transmitted power and the received power. The path loss of the serving cell measured by the UE is measured by using the reference signal sent by the serving cell. The above power expression is used, since feedback is not considered in LTE V2X, and only one-way transmission needs to be considered. It may be seen from the above formula that, take no account of the first item in the expression, when the UE performs V2X transmission, the V2X transmission power needs to take min (the maximum generation power of the UE on the current frequency, and the transmission power that the UE requires for calculation of the path loss per serving cell, that is, the path loss is used as power compensation), that is, a smaller value is taken from the maximum generation power of the UE on the current frequency and the transmission power that the UE requires for calculation of the path loss per serving cell.

Figure 5:
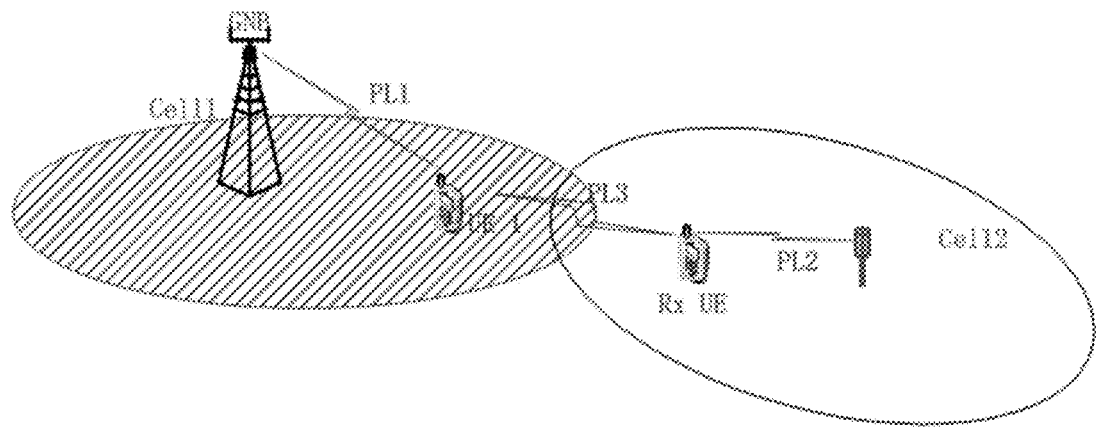
FIG. 5 shows a schematic diagram of an application example according to the present disclosure.

However, feedback needs to be considered in NR V2X. At this time, it is bidirectional transmission. FIG. 5 shows a schematic diagram of an application example according to the present disclosure. In a scenario shown in FIG. 5, UE 1 is located in the coverage of Cell 1. The Rx UE is located in the coverage of Cell 2, the path loss of a serving cell (i.e., Cell1) measured by the UE 1 is PL1, and the path loss of a serving cell (i.e., Cell2) measured by the Rx UE is PL2. The path loss of the direct link between UE 1 and Rx UE is PL3. Assuming that these two UEs both send the reference signals, the other party may infer the path loss PL3 of the direct link based on detection of the reference signal and the transmission power of the reference signal.

In the bidirectional transmission process, UE 1 transmits V2X data to Rx UE, and feedback is required at this time. That is, the Rx UE also needs to send a signal to UE 1. When a distance between two UEs is very close, V2X transmission only needs to use the direct link path loss PL3 to perform power compensation (e.g., the transmission power is equal to a sum of the target power and the path loss expected at a reception terminal, which is similar to expression of the direct link transmission power in LTE, and a compensation scale factor may be introduced for the path loss). In this way, it not only ensures accuracy of data transmission, but also reduces interference to other users. Therefore, UE 1 or Rx UE only needs to base on min (SL PL, Uu PL) to perform power compensation during transmission, where SL PL is path loss of the direct link (Sidelink Pathloss), and Uu PL is the path loss of the service cell measured by the transmission UE. Therefore, the UE 1 uses min (PL3, PL1) for power compensation during transmission, and the Rx UE uses min (PL3, PL2) for power compensation during transmission.

Based on the above reasons, in multi-carrier data transmission, the influence of the transmission power of the first and second UEs on the multi-carrier transmission in addition to factors such as carrier aggregation should be considered during bidirectional transmission. Therefore, in a possible implementation, when the first UE needs feedback from the second UE, status of the second UE further includes: a power compensation status of the second UE on the candidate carrier; or, an expected power compensation status of the second UE. In an example, when the first UE needs feedback from the second UE, the second UE may consider whether it can perform power compensation with the path loss of the direct link on the candidate carrier, thereby implementing V2X transmission. In case that the path loss of the direct link cannot be used for power compensation on a certain carrier, then in this scenario, even if the second UE sends a signal to the first UE on this carrier, the first UE may not receive it. The second UE may not return this carrier to the first UE, or it may instruct the first UE that the power compensation cannot be performed with the path loss of direct link on this carrier. After the first UE receives the instruction, it may consider not selecting this carrier for multi-carrier transmission.

The process of the method for multi-carrier data transmission in the above content is all described with the first UE as a transmitter and the second UE as a receiver. In a possible implementation, the first UE and the second UE may perform bidirectional data transmission. At this time, the roles of these two may be exchanged, and the multi-carrier transmission process may also be adjusted accordingly, which is not be elaborated here.

In this way, for UEs of both parties in direct communication, the carrier that can perform multi-carrier transmission may be selected through the above methods, so as to avoid that the UE of a transmitter only configures the carrier for transmission based on its own situations, causing the UE of the receiver may not effectively receive the transmission content, thereby improving effect and reliability of multi-carrier transmission.

Furthermore, in a possible implementation, when a first UE and a second UE perform multi-carrier transmission, a transmission process of the first UE may include:

performing data transmission with the second UE via a first carrier;
configuring to the second UE, reference signals on other carriers except the first carrier;
configuring a measurement event; and
receiving a feedback result of the second UE based on the measurement event.

In the above process, the first UE may configure a reference signal on other carriers in the indirect link and configure measurement events for evaluation, so that the second UE may perform corresponding measurements according to situations on other carriers, and feed the result back to the first UE in case of triggering a measurement event. The first UE may send the configuration parameters of the reference signal on other carriers to the second UE via PC5 RRC signaling. The configuration parameter may be a cycle, time slot information of the reference signal, and the like. Implementation form of the measurement event is not limited. In an example, the measurement event may be that quality of the reference signal received by the second UE exceeds a preset threshold. The preset threshold may be set according to the actual situations, may be set by the first UE via PC5 RRC signaling, and may be not specifically limited. In an example, the measurement event may be that the quality of the reference signal received by the second UE is higher than the quality of signal on the current operating carrier (i.e., the first carrier) by a predetermined offset. A value of the offset may also be set according to actual situations, which is not limited here. The measurement event may also be other situations, which are not listed here. If the above measurement events are satisfied, the corresponding carrier and the measurement result on the carrier may be fed back to the first UE from the second UE, the first UE may then use these carriers to perform subsequent operations based on the feedback result of the second UE. The specific process and form of subsequent operations are also not limited. In an example, the subsequent operations may be those mentioned in the above content. The carrier fed back by the second UE is used for multi-carrier data transmission. It is appreciated that the carrier fed back by the second UE may be used to perform other operations, which will not be listed here.

Figure 6:
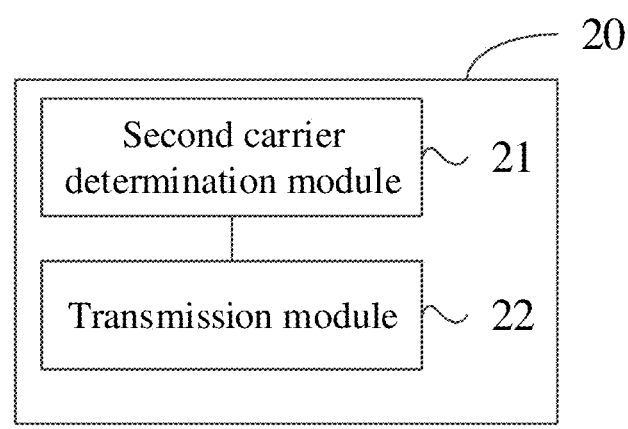
FIG. 6 shows a block diagram of a device for multi-carrier data transmission according to an embodiment of the present disclosure.

FIG. 6 shows a block diagram of a device for multi-carrier data transmission according to an embodiment of the present disclosure. As shown in FIG. 6, the device 20 includes:

- a second carrier determination module 21 configured to determine a second carrier for performing multi-carrier data transmission based on a status of a second UE when data transmission is performed with the second UE via a first carrier; and
- a transmission module 22 configured to perform data transmission with the second UE via the first carrier and the second carrier.

Figure 7:
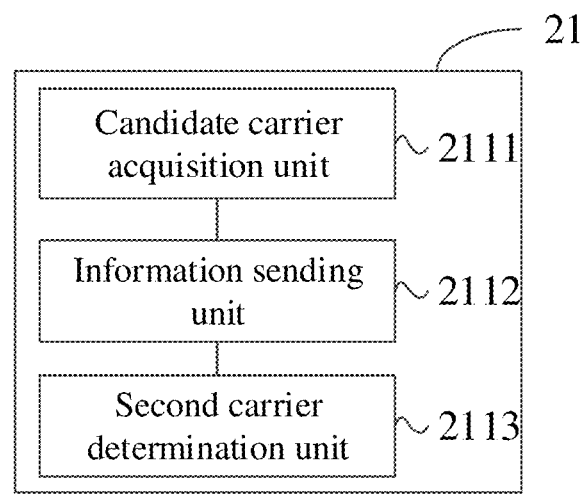
FIG. 7 shows a block diagram of a device for multi-carrier data transmission according to an embodiment of the present disclosure.

FIG. 7 shows a block diagram of a device for multi-carrier data transmission according to an implementation of the present disclosure. As shown in FIG. 7, in a possible implementation, the second carrier determination module 21 includes:

- a candidate carrier acquisition unit 2111 configured to acquire candidate carriers;
- an information sending unit 2112 configured to send information to the second UE based on the candidate carriers;
- a second carrier determination unit 2113 configured to determine the second carrier for performing multi-carrier data transmission according to a feedback result of the second UE.

In a possible implementation, the candidate carrier acquisition unit is configured to select carriers that can be aggregated with the first carrier as the candidate carrier.

In a possible implementation, the candidate carrier acquisition unit is configured to screen carriers that can be aggregated with the first carrier to obtain a screening result, and select, from the screening result, carriers having available transmission resources as the candidate carriers.

In a possible implementation, the information sending unit is configured to send a message of the candidate carriers to the second UE, or configure a reference signal on the candidate carriers, and send configuration parameters of the reference signal to the second UE.

In a possible implementation, the feedback result of the second UE includes: the carriers selected by the second UE from the message of the candidate carrier according to its own capability, or, the carriers selected by the second UE from the candidate carriers based on a reception result of the reference signal.

Figure 8:
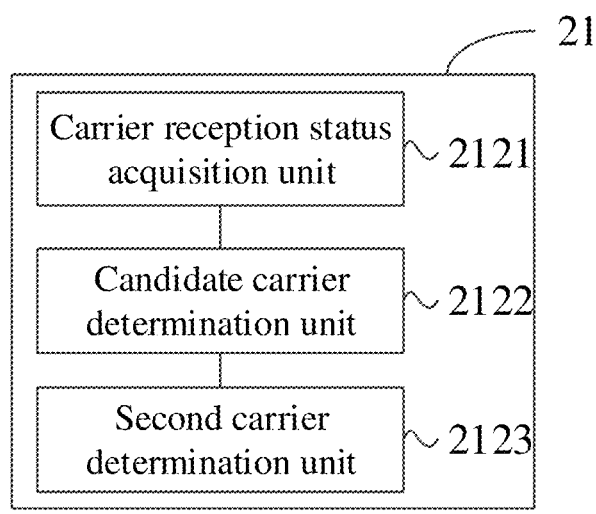
FIG. 8 shows a block diagram of a device for multi-carrier data transmission according to an embodiment of the present disclosure.

FIG. 8 shows a block diagram of a device for multi-carrier data transmission according to an implementation of the present disclosure. As shown in FIG. 8, in a possible implementation, the second carrier determination module 21 includes:

- a carrier reception status acquisition unit 2121 configured to acquire a carrier reception status of the second UE;
- a candidate carrier determination unit 2122 configured to determine the candidate carriers based on the acquired result; and
- a second carrier determination unit 2123 configured to determine the second carrier for performing multi-carrier data transmission based on the candidate carriers in combination with the status of the second UE.

In a possible implementation, the carrier reception status acquisition unit is configured to directly acquire the carrier reception status of the second UE, or, configured to instruct the second UE that multi-carrier data transmission is required, and acquire the carrier reception status of the second UE that is fed back.

In a possible implementation, the carrier reception status of the second UE includes carrier aggregation capability of the second UE for performing data transmission, or, bandwidth combination capability of the second UE.

In a possible implementation, the carrier reception status of the second UE includes: the carrier aggregation capability of the second UE with the first carrier when the second UE performs data transmission.

In a possible implementation, when the device needs feedback, the status of the second UE further includes: a sensing result of the second UE on the candidate carriers.

In a possible implementation, when the device needs feedback, the status of the second UE further includes: the power compensation status of the second UE on the candidate carrier, or, the expected power compensation status of the second UE.

Figure 9:
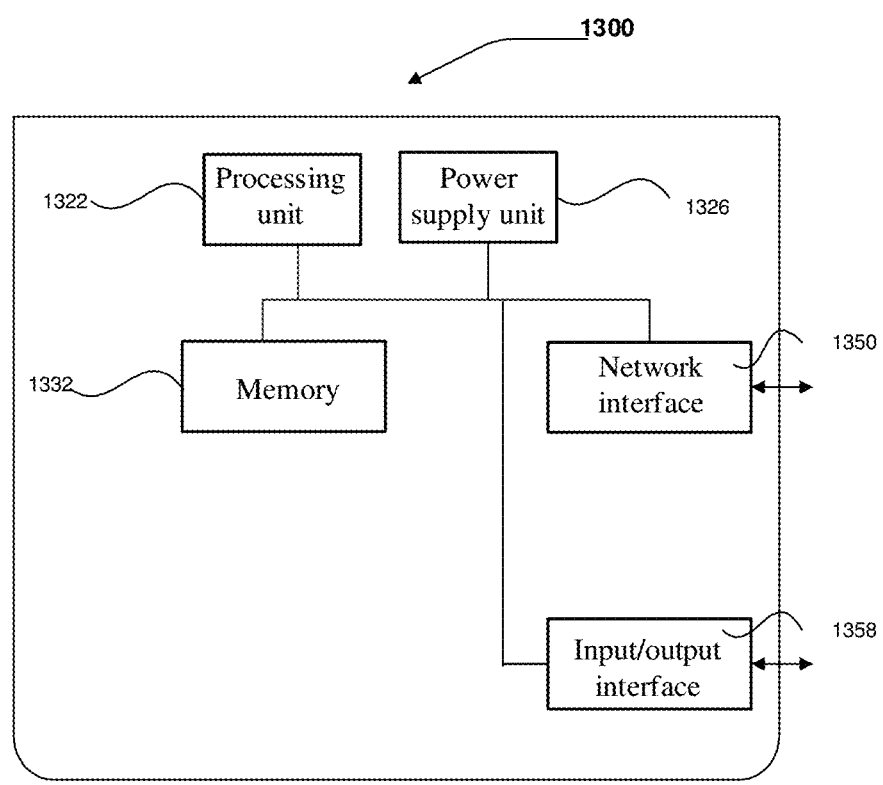
FIG. 9 shows a block diagram of a device for multi-carrier data transmission according to an embodiment of the present disclosure.

FIG. 9 is a block diagram showing a device for multi-carrier data transmission 1300 according to an exemplary embodiment. For example, the device 1300 may be provided as a server. Referring to FIG. 9, the device 1300 includes a processing unit 1322 and memory resource represented by a memory 1332. The processing unit 1322 further includes one or more processors. The memory 1332 is configured to store instructions, such as application programs, executable by the processing unit 1322. The application program stored in the memory 1332 may include one or more modules each of which corresponds to a set of instructions. In addition, the processing unit 1322 is configured to execute instructions to perform the above-mentioned method.

The device 1300 may also include a power supply unit 1326 configured to perform power management of the device 1300, a wired or wireless network interface 1350 configured to connect the device 1300 to the network, and an input-output (I/O) interface 1358. The device 1300 may operate an operating system stored in the memory 1332, such as Windows Server™, Mac OS X™, Unix™, Linux™, FreeBSD™ or the like.

In an exemplary embodiment, there is also provided a non-volatile computer-readable storage medium, such as the memory 1332 including computer program instructions. The above computer program instructions may be executed by the processing unit 1322 of the device 1300 to complete the foregoing method.

The present disclosure may be a system, method and/or computer program product. The computer program product may include a computer-readable storage medium loaded with computer-readable program instructions for enabling a processor to implement various aspects of the present disclosure.

The computer-readable storage medium may be a tangible device that may hold and store instructions used by an instruction execution device. The computer-readable storage medium may be, for example, but not limited to, an electrical storage device, a magnetic storage device, an optical storage device, an electromagnetic storage device, a semiconductor storage device, or any suitable combination of the foregoing devices. More specific examples (non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device, e.g., a punched card or a projection structure in a groove on which instructions are stored, and any suitable combination thereof. The computer-readable storage medium used here is not interpreted as a transient signal itself, such as radio waves or other freely propagating electromagnetic waves, electromagnetic waves propagating through waveguides or other transmission media (for example, by light pulse of a fiber optic cable), or an electrical signal transmitted by wire.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network, and forwards the computer-readable program instructions for storage in the computer-readable storage medium in each computing/processing device.

The computer program instructions for performing operations of the present disclosure may be assembly instructions, instruction set architecture (ISA) instructions, machine instructions, machine-related instructions, microcode, firmware instructions, status setting data, or, source code or object code written in any combination of one or more programming languages. The programming language includes object-oriented programming languages such as Smalltalk, C++, and the like, and conventional procedural programming languages such as "C" language or similar programming languages. Computer-readable program instructions may be executed entirely on the user's computer, partly on the user's computer, executed as a stand-alone software package, partly executed on the user's computer and partly executed on a remote computer, or entirely executed on the remote computer or server. In the case of concerning a remote computer, the remote computer may be connected to the user's computer via any kind of network including a local area network (LAN) or a wide area network (WAN), or it may be connected to an external computer (for example, using an internet service provider to connect via internet). In some embodiments, an electronic circuit, such as a programmable logic circuit, a field programmable gate array (FPGA), or a programmable logic array (PLA), may be customized by using the status information of the computer-readable program instructions. The electronic circuit may execute the computer-readable program instructions so as to achieve various aspects of the present disclosure.

Herein, various aspects of the present disclosure are described with reference to flow charts and/or block diagrams of methods, devices (systems) and computer program products according to embodiments of the present disclosure. It should be understood that each block of the flow charts and/or block diagrams, and combinations of blocks in the flow charts and/or block diagrams, may be implemented by the computer-readable program instructions.

These computer-readable program instructions may be provided to processors of general-purpose computers, dedicated computers, or other programmable data processing devices, thereby producing a machine. A device that implements the functions/actions specified in one or more blocks in the flow charts and/or block diagrams is produced when these instructions are executed by the processors of the computer or other programmable data processing devices. It is also possible to store these computer-readable program instructions in a computer-readable storage medium. These instructions make computers, programmable data processing devices, and/or other devices work in a particular manner. Thus, the computer-readable medium storing the instructions includes an manufactured article includes instructions for implementing various aspects of the functions/actions specified in one or more blocks in the flow charts and/or block diagrams.

It is also possible to load computer-readable program instructions on a computer, other programmable data processing device, or other devices, so that a series of operation steps are executed on the computer, other programmable data processing device, or other equipment to produce a computer-implemented process, so that the instructions executed on the computer, other programmable data processing devices, or other devices achieve the functions/actions specified in one or more blocks in the flow charts and/or block diagrams.

The flow charts and block diagrams in the accompanying drawings show the possible implemented architecture, functions, and operations of the system, method, and computer program product according to multiple embodiments of the present disclosure. In this regard, each block in the flow chart or block diagram may represent a module, program segment, or part of an instruction. A part of the module, the program segment, or the instruction contains one or more executable instructions for achieving the specified logical function. In some alternative implementations, functions marked in the block may also occur in a different order than the order marked in the drawings. For example, two consecutive blocks may actually be executed substantially in parallel, or may sometimes be executed in a reverse order, depending on the functions involved. It should also be noted that each block in the block diagram and/or flow chart, and combinations of the blocks in the block diagram and/or flow chart, may be implemented by a dedicated hardware-based system that performs the specified functions or actions or it may be achieved by a combination of dedicated hardware and computer instructions.

The embodiments of the present disclosure have been described above, and the above description is exemplary, not exhaustive, and is not limited to the disclosed embodiments. Without departing from the scope and spirit of the described embodiments, it is obvious to those of ordinary skill in the art to make many modifications and changes. The choice of terms used herein is intended to best explain principles, practical applications, or technical improvements in the market of the implementations, or to enable other ordinary skilled in the art to understand embodiments disclosed herein.

The embodiments of the present disclosure have been described above, and the above description is exemplary, not exhaustive, and is not limited to the disclosed embodiments. Without departing from the scope and spirit of the described embodiments, it is obvious to those of ordinary skill in the art to make many modifications and changes. The choice of terms used herein is intended to best explain principles of the various embodiments, practical applications, or technical improvements in the market, or to enable other ordinary skilled in the art to understand embodiments disclosed herein.

What is claimed is:

1. A method for multi-carrier data transmission applied to a first user equipment (UE), the method comprising:

performing, by the first UE, data transmission between the first UE and a second UE via a first carrier;

screening at least one or more carriers that are capable of being aggregated with the first carrier to obtain a screening result;

selecting, from the screening result, at least one carrier of the at least one or more carriers as at least one candidate carrier, wherein the at least one carrier is having an available transmission resource;

sending information to the second UE based on the at least one candidate carrier;

determining, based on a feedback result of the second UE, a second carrier for performing multi-carrier data transmission; and performing data transmission between the first UE and the second UE via the first carrier and the second carrier.

2. The method for multi-carrier data transmission according to claim 1, wherein said sending information to the second UE based on the at least one candidate carrier comprises:

sending a message of the at least one candidate carrier to the second UE; or configuring a reference signal on the at least one candidate carrier, and sending a configuration parameter of the reference signal to the second UE.

3. The method for multi-carrier data transmission according to claim 2, wherein the feedback result of the second UE comprises:

a carrier selected by the second UE from the message of the at least one candidate carrier based on capability of the second UE; or a carrier selected by the second UE from the at least one candidate carrier based on a reception result of the reference signal.

4. The method for multi-carrier data transmission according to claim 1, wherein in response to the first UE needing feedback, the status of the second UE further comprises: a sensing result of the second UE on the at least one candidate carrier.

5. The method for multi-carrier data transmission according to claim 1, wherein in response to the first UE needing feedback, the status of the second UE further comprises:

a power compensation status of the second UE on the at least one candidate carrier; or an expected power compensation status of the second UE.

6. The method for multi-carrier data transmission according to claim 1, wherein said determining, based on the status of the second UE, the second carrier for performing multi-carrier data transmission comprises:

acquiring a carrier reception status of the second UE;

determining, based on the acquired result, at least one candidate carrier; and determining, based on the at least one candidate carrier and in combination with the status of the second UE, the second carrier for performing multi-carrier data transmission.

7. The method for multi-carrier data transmission according to claim 6, wherein said acquiring the carrier reception status of the second UE comprises:

directly acquiring the carrier reception status of the second UE; or instructing the second UE that multi-carrier data transmission is required, and acquiring the carrier reception status of the second UE that is fed back.

8. The method for multi-carrier data transmission according to claim 6, wherein the carrier reception status of the second UE comprises:

carrier aggregation capability of the second UE for data transmission; or bandwidth combination capability of the second UE.

9. The method for multi-carrier data transmission according to claim 8, wherein the carrier reception status of the second UE comprises: the carrier aggregation capability of the second UE with the first carrier during a process in which the second UE performs data transmission.

10. A device for multi-carrier data transmission, comprising:

a memory; and at least one processor coupled to the memory and configured to:

perform, by a first UE, data transmission between the first UE and a second UE via a first carrier;

screen at least one or more carriers that are capable of being aggregated with the first carrier to obtain a screening result;

select, from the screening result, at least one carrier of the at least one or more carriers as at least one candidate carrier, wherein the at least one carrier is having an available transmission resource;

send information to the second UE based on the at least one candidate carrier;

determine, based on a feedback result of the second UE, a second carrier for performing multi-carrier data transmission; and perform data transmission between the first UE and the second UE via the first carrier and the second carrier.

11. The device for multi-carrier data transmission according to claim 10, wherein the at least one processor is further configured to:

send a message of the at least one candidate carrier to the second UE; or configure a reference signal on the at least one candidate carrier, and send a configuration parameter of the reference signal to the second UE, wherein the feedback result of the second UE comprises:

a carrier selected by the second UE from the message of the at least one candidate carrier based on capability of the second UE; or a carrier selected by the second UE from the at least one candidate carrier based on a reception result of the reference signal.

12. The device for multi-carrier data transmission according to claim 10, wherein the at least one processor is further configured to:

acquire a carrier reception status of the second UE;

determine the at least one candidate carrier based on the acquired result; and determine, based on the at least one candidate carrier and in combination with the status of the second UE, the second carrier for performing multi-carrier data transmission.

13. The device for multi-carrier data transmission according to claim 12, wherein the carrier reception status of the second UE comprises:

carrier aggregation capability of the second UE for data transmission; or bandwidth combination capability of the second UE.

14. The device for multi-carrier data transmission according to claim 10, wherein in response to the device needing feedback, the status of the second UE further comprises:

a sensing result of the second UE on the at least one candidate carrier;

or wherein in response to the device needing feedback, the status of the second UE further comprises:

a power compensation status of the second UE on the at least one candidate carrier; or an expected power compensation status of the second UE.

15. A non-transitory storage medium having computer program instructions stored therein,
wherein the computer program instructions, when executed by a processor, are configured to implement a method for multi-carrier data transmission applied to a first user equipment (UE), the method comprising:
performing, by the first UE, data transmission between the first UE and a second UE via a first carrier;
screening at least one or more carriers that are capable of being aggregated with the first carrier to obtain a screening result;
selecting, from the screening result, at least one carrier of the at least one or more carriers as at least one candidate carrier, wherein the at least one carrier is having an available transmission resource;
sending information to the second UE based on the at least one candidate carrier;
determining, based on a feedback result of the second UE, a second carrier for performing multi-carrier data transmission; and
performing data transmission between the first UE and the second UE via the first carrier and the second carrier.

* * * * *